(12) United States Patent
Shaffer et al.

(10) Patent No.: US 7,655,149 B1
(45) Date of Patent: Feb. 2, 2010

(54) OIL ABSORBENT KENAF BALLS AND KITS, AND METHODS OF MAKING AND USING THE SAME

(75) Inventors: Dyke C. Shaffer, Farmer City, IL (US); Robert L. Reed, Clinton, IL (US)

(73) Assignee: Raybif Industries Inc., Savoy, IL (US)

( * ) Notice: Subject to any disclaimer, the term of this patent is extended or adjusted under 35 U.S.C. 154(b) by 0 days.

(21) Appl. No.: 12/247,660

(22) Filed: Oct. 8, 2008

Related U.S. Application Data

(60) Provisional application No. 60/998,489, filed on Oct. 11, 2007.

(51) Int. Cl.
*C02F 1/42* (2006.01)
(52) U.S. Cl. .................... 210/691; 210/924
(58) Field of Classification Search ......... 210/690–693, 210/922–925
See application file for complete search history.

(56) References Cited

U.S. PATENT DOCUMENTS

| | | | |
|---|---|---|---|
| 5,271,691 A | 12/1993 | Willett | 405/60 |
| 5,970,582 A | 10/1999 | Stover | 19/5 |
| 6,852,234 B2 * | 2/2005 | Breitenbeck | 210/693 |

FOREIGN PATENT DOCUMENTS

JP    2000263520 A  *  9/2000

OTHER PUBLICATIONS

Derwent Accession No. 2000-650488 (English Abstract of JP 2000-263520A), published 2000.*

* cited by examiner

*Primary Examiner*—Chester T Barry
(74) *Attorney, Agent, or Firm*—Alvin T. Rockhill

(57) ABSTRACT

This invention is based upon the discovery that kenaf balls that are comprised of an entangled mass of kenaf fibers are highly useful for absorbing oil and other organic liquids from oil spill areas on land or water. In fact, the kenaf balls of this invention are capable of absorbing oil in an amount of over 1000% of their own weight and in some cases even over 1800% of their own weight. The subject invention more specifically discloses a kenaf ball which is comprised of an entangled mass of kenaf fibers, wherein the kenaf ball has a density which is within the range of about 0.02 g/cc to about 0.15 g/cc, and wherein the kenaf ball has a mass which is within the range of 0.2 grams to about 10 grams.

19 Claims, No Drawings

OIL ABSORBENT KENAF BALLS AND KITS, AND METHODS OF MAKING AND USING THE SAME

This application claims benefit of U.S. Provisional Patent Application Ser. No. 60/998,489, filed on Oct. 11, 2007. The teachings of U.S. Provisional Patent Application Ser. No. 60/998,489 are incorporated herein by reference in their entirety.

BACKGROUND OF THE INVENTION

Hibiscus cannabinus, which is commonly known as kenaf, is a annual or biennial herbaceous plant that is grown to heights of 12 to 18 feet in as little as 4 to 5 months. Kenaf can produce 5-10 tons of dry fiber and core per acre and typically does not require treatment with herbicides or pesticides. The kenaf plant is believed to have originated in Africa or Asia and has been cultivated for its fiber in India, Bangladesh, Thailand, and Egypt for thousands of years. Kenaf fiber, which is frequently referred to simply as "knaft," has traditionally been used in manufacturing rope, twine, clothing, rugs, and paper. Today the kenaf plant is also being commercially cultivated in the Untied States.

The kenaf plant is comprised of two distinct types of different materials. These materials include an outer fiber and a core. The outer fiber is frequently referred to as simply the fiber and is sometimes called the bast or the bast fiber. The bast accounts for about one-third of the plant by weight. The core is a low density woody type material while the bast is a much lower density fluffy type fiber of high tensile strength. As harvested, the bast fibers tenaciously adhere to the core. In a typical harvested kenaf crop, the core is slightly tapered from bottom to top and has a small diameter at the top in the range of 0.25 inch to 0.5 inch.

The core and fibers have distinctly different uses and must be separated before they are suitable for these different uses. The core is useable as animal bedding, oil-absorbent material for oil spill cleanup, potting soil, kitty litter and particle board or other similar construction materials. The most promising high volume use of bast fibers is in paper manufacture. Another potential high volume use is in the manufacture of fiberboard used in automotive door panels and the like. The economics of using bast fibers in such high volume applications is attractive because the cost of the cultivated crop compares very favorably to the cost of timber which is the conventional source of fiber used in paper and fiberboard production.

U.S. Pat. No. 5,970,582 discloses a method of separating kenaf into its constituents of fiber and core comprising the steps of delivering lengths of kenaf onto a periphery of a saw cylinder comprising a multiplicity of spaced apart teeth; rotating the saw cylinder and snagging the fiber on the teeth, moving snagged lengths of kenaf into contact with a grate and delivering pieces of core through the grate thereby separating the core from the fiber; and removing the fiber from the saw cylinder.

As has been noted, kenaf core is an oil-absorbent material that is used for oil spill cleanup. For instance, U.S. Pat. No. 5,271,691 discloses using kenaf core particles for adsorbing oil spills on water and on dry surfaces. The kenaf used in the oil cleanup technique of U.S. Pat. No. 5,271,691 can be comprised entirely of core material. However, the teachings of this patent also indicate that mixtures containing 90% core and 10% bast can also be used. U.S. Pat. No. 5,271,691 further indicates that in floor sweeping applications that it is preferable to utilize a mixture containing 80% core material and 20% bast.

Particles or pellets of clay are also commonly used as an absorbent for spilled oil. Clay is relatively inexpensive and can be used to absorb oil that has been spilled onto the ground and other hard surfaces, such as concrete and asphalt. However, clay pellets cannot be used to cleanup oil that has been spilled on water. This is because clay is more dense than water and sinks rather than floating on the water's surface. Oil saturated clay pellets also tend to disintegrate in cleanup operations when attempts are made to recover them by sweeping. Thus, using clay as an absorbent for recovering spilled oil can be a messy procedure. Another drawback associated with using clay pellets as an absorbent in oil cleanup operations is that disposal of the oil saturated clay pellets also presents a disposal problem. For example, oil saturated clay pellets will not burn and there is no simple way to recover that oil from the pellets. Accordingly, the oil saturated pellets are typically discarded into a landfill which leads to other undesirable environmental issues.

SUMMARY OF THE INVENTION

This invention is based upon the discovery that kenaf balls or kenaf entanglements that are comprised of an entangled mass of kenaf fibers are highly useful for absorbing oil and other organic liquids from oil spill areas on land or water. In fact, the kenaf balls of this invention are capable of absorbing oil in an amount of over 1000% of the own weight. In some cases, the kenaf balls of this invention are capable of absorbing oil in an amount of over 1500% or even over 1800% of the own weight. This is accomplished by the kenaf balls trapping or ensnarling the oil by absorbing and/or adsorbing it within the matrix structure of the kenaf balls. In any case, this is a much higher level of oil pick-up than can be achieved with clay pellets or kenaf core material.

The subject invention more specifically discloses a kenaf ball which is comprised of an entangled mass of kenaf fibers, wherein the kenaf ball has a density which is within the range of about 0.02 g/cc to about 0.15 g/cc, and wherein the kenaf ball has a mass which is within the range of 0.2 grams to about 10 grams. The fibers in the kenaf balls of this invention typically have a fiber length which is within the range of about ⅛ inch (0.3 cm) to about 12 inches (30.5 cm).

The present invention also reveals an oil cleanup kit which is comprised of a plurality of kenaf balls, wherein the kenaf balls are comprised of an entangled mass of kenaf fibers, wherein the kenaf balls has an average density which is within the range of about 0.02 g/cc to about 0.15 g/cc, and wherein the kenaf balls have an average mass which is within the range of 0.2 grams to about 10 grams.

The subject invention further discloses a method for cleaning an oil spill area which comprises: (1) placing a plurality of kenaf balls in contact with the oil in the oil spill area, (2) allowing the kenaf balls to remain in contact with the oil for a period of time which is sufficient for the oil to be substantially absorbed into the kenaf balls to produce oil containing kenaf balls, and (3) removing the oil containing kenaf balls from the oil spill area. The oil saturated kenaf balls that are removed from the oil spill area can subsequently be burned. Preferably, the oil in the oil saturated kenaf balls that are removed from the oil spill area is recovered are recycled. This can be accomplished by simply squeezing the oil out of the oil saturated kenaf balls. The kenaf balls used in the oil recovery are also preferably recycled after the oil is recovered from them.

The present invention also reveals a method for manufacturing kenaf balls which comprises subjecting kenaf fibers to a tumbling action for a period of time that is sufficient to entangle the kenaf fibers into entangled balls having masses which are within the size range of about 0.2 grams to about 10 grams, wherein the kenaf balls have a density which is within the range of about 0.02 g/cc to about 0.15 g/cc.

DETAILED DESCRIPTION OF THE INVENTION

The kenaf balls of this invention are comprised of an entangled mass of kenaf fibers. The entangled kenaf fibers in the kenaf balls of this invention are present as a non-woven mass of kenaf fibers. Such kenaf balls have a density which is within the range of about 0.02 g/cc to about 0.15 g/cc, and a mass which is within the range of 0.2 grams to about 10 grams. The low density of the kenaf balls of this invention is caused by the kenaf balls containing a substantial volume of interstices between the kenaf fibers. These interstices penetrate the kenaf balls and open to the outside. In other words, the kenaf balls of this invention contain a significant amount of void space, and the void space is comprised of a substantial amount of open pores or cavities which penetrate the kenaf ball. Oil has an affinity for these void spaces and is readily drawn into them in cases where kenaf balls come into contact with oil.

The kenaf balls of this invention typically have a density which is within the range of about 0.04 g/cc to about 0.12 g/cc. They more typically have a density which is within the range of about 0.05 g/cc to about 0.1 g/cc. The kenaf balls of this invention preferably have a density which is within the range of about 0.06 g/cc to about 0.09 g/cc, and more preferably have a density which is within the range of about 0.07 g/cc to about 0.08 g/cc. However, in some cases it is preferred for the kenaf balls to be somewhat smaller. For instance, this might be the case in situations where the kenaf balls are applied to an oil spill by being (1) blown out by air, (2) blown out in a liquid slurry, (3) dumped by a truck in a large volume, (4) hand applied, (5) shoveled, or (6) rolled.

The kenaf balls of this invention typically have a mass which is within the range of 0.5 grams to about 5 grams and more typically have a mass which is within the range of 0.7 grams to about 3 grams. The kenaf balls of this invention preferably have a mass which is within the range of 0.8 grams to about 2 grams. The kenaf balls typically have a length in their longest dimension of less than 3 inches and more typically have a length in their longest dimension of less than 2.5 inches. The kenaf balls preferably have a length in their longest dimension of less than 2 inches, and more preferably have a length in their longest dimension of less than 1.5 inches. The kenaf balls will typically have a length in their longest dimension of at least 0.5 inch, and will frequently have a length in its longest dimension of at least 0.75 inch. The kenaf balls will sometimes have a length in their longest dimension of at least 1 inch.

The kenaf balls of this invention will normally contain less than 25 weight percent core material, and will more typically contains less than 20 weight percent core material. In most cases the kenaf balls of this invention will contains less than 10 weight percent core material, and will preferably contain less than 5 weight percent core material. The kenaf balls will more preferably contain less than 2 weight percent core material, and the most preferably contain less than 1 weight percent core material. The kenaf balls will also normally be void of binders containing carboxyl groups.

The kenaf balls of this invention are not of any particular shape. For instance, they can be spherical, oblong shaped, football shaped, conical, cylindrical, or of other like shapes. These kenaf balls are made by tumbling kenaf fibers (bast) in an appropriate mixer for a period of time that is sufficient to produce kenaf balls of the desired size. As the kenaf fibers are tumbled together they become entangled to form the kenaf balls of this invention. Larger kenaf balls are produced by continuing the tumbling action for longer time periods. The kenaf balls can conveniently be produced by mixing the kenaf fibers in a standard soil mixer. Kenaf balls can also be made by tumbling kenaf fibers in a paddle mixer, a clothes drier, a small square box, a wire mixer/tumbler, a rectangular box, a cement mixer, a ribbon mixer, or an air mixer.

After being produced by mechanical action the kenaf balls of this invention can be used in oil recovery applications without further processing or treatment. However, in some applications it is desirable for the kenaf balls to be bound together is some manner to facilitate application to an oil spill and to make recovery of the kenaf balls from the site of the oil spill easier. For instance, the kenaf balls can be bound together in the form of a rope, a blanket, a sock, a roll, or a mat. More specifically, the kenaf balls can be woven into a blanket having an open weave pattern. They can also be woven into a thick towel of kenaf balls for use in the clean up of small oil spill areas and to clean up wildlife. A non-woven mass of interlaced fibers or a mass of interlacing fibers can be woven into an open sponge of a size that is appropriate for small applications.

Normally the kenaf balls will be packaged in sacks, bags, or boxes for shipment to ultimate users for use in oil spill cleanup procedures. The term oil as used herein includes crude oil, motor oil, light lubricating oil, brake fluid, transmission fluid, gear oil, vegetable oils, oils derived from animal sources, and the like. The term oil as used herein is also meant to include a wide variety of other organic, non-aqueous fluids including antifreeze, gasoline, alcohols, aromatic solvents, such as benzene and toluene, and aliphatic solvents, such as normal-hexane and cyclo-hexane. The term oil is also meant to include halogen containing liquid compounds, such as carbon tetrachloride. Some specific examples of oils that can be absorbed into kenaf balls include synthetic oils, corn oil, cotton oil, soybean oil, peanut oil, sunflower oil, canola oil, fish oils, nut oils, animal oils, road oils, ethanol, methyl alcohol, isopropyl alcohol, normal-propal alcohol, t-butyl alcohol.

The kenaf balls of this invention can be used to absorb oil in oil spill areas that are on water, land, concrete pavement, asphalt pavement, and other hard surfaces, such as the floor of a factory, shop or work area. To cleanup oil spills the kenaf balls of this invention can be simply dumped onto an oil spill area. The oil is then absorbed into the kenaf balls which can subsequently be easily removed from the oil spill area. The oil containing kenaf balls can be removed from the spill area by any appropriate collection technique. For instance, the oil laden kenaf balls can be collected from hard surfaces by sweeping using a conventional broom. In the case of oil spills on the ground, it is typically convenient to collect the oil laden kenaf balls by raking them up. The oil laden kenaf balls can then be discarded, burnt or recycled.

The kenaf balls can also be used as an oil absorbent in situations where spilled oil is floating on water. This is because the kenaf balls have a much higher affinity for oil and other hydrocarbons than they do for water. Additionally, the kenaf balls are buoyant and float on water as does the spilled oil. Thus, the kenaf balls float in the slick of spilled oil on the surface of the water. When the kenaf balls are introduced into the oil slick floating on the surface of the water they absorb a high amount of oil and a much smaller amount of water. This unique characteristic is important when the cost of an oil spill cleanup is calculated. With the high cost of the disposal of the absorbent and the oil being a large expense of the cleanup, the weight of the material to be disposed of is reduced because kenaf balls has absorbed mostly oil and very little water. Further, it has been found that the kenaf balls can float on the surface of water for extended periods of time.

Oil laden kenaf balls that are collected from water or dry surfaces can be handled in exactly the same way. It is typically convenient to burn the oil laden kenaf balls. On incineration oil laden kenaf balls produces about 7,000 BTU's per pound of material and have an ash residue of less than three percent 3%. The BTU rating will increase or decrease depending upon the nature and level of oil that has been absorbed.

Since kenaf balls are totally biodegradable they can be discarded into landfill without significant environmental consequences. Additionally, if some kenaf balls are lost during oil spill cleanup efforts the environmental impact thereof is again insignificant. However, kenaf balls never need to be sent to land fills since they can be burned as a fuel source rather than being disposed of in a land fill. Accordingly, kenaf ball are environmentally sounder than conventional products that are used to absorb oil from spill areas.

In one embodiment of this invention, absorbed oil is recovered from the oil laden kenaf balls used in cleanup operations and recycled for used in appropriate applications. This can be done by simply squeezing the oil out of the oil laden kenaf balls. For instance, the oil can be recovered by running the oil laden kenaf balls through a set of rollers or a ringer. Oil can be recovered from kenaf balls by a wide variety of techniques and equipment that is capable of squeezing the kenaf balls or applying pressure to them to force oil out of them. This can be accomplished by applying pressure to the kenaf balls through pneumatic, hydraulic and/or mechanical means. Oil can also by recovered from kenaf balls by applying a vacuum thereto. However, in cases where the kenaf balls will be recycled for further use in cleaning up oil spills, care should be taken not to put the kenaf balls under a pressure that is high enough to destroy the physical structure of the network of interstices between the kenaf fibers.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLES 1-5

In this series of experiments various organic liquids were added to cups that were approximately half full of water. All of the organic liquid floated as "oil slicks" on the surfaces of the water. Five kenaf balls were subsequently added to each of the cups and they were allowed to remain in the oil slicks for a few minutes to adsorb the organic liquids. Then the oil laden kenaf balls were removed from the cups and the amount of organic liquid adsorbed was weighed. The organic liquid used and the percentage of organic liquid that was picked up based upon the total weight of the kenaf balls is shown in Table 1.

TABLE 1

| Example | Organic Liquid | Weight Percentage of Pickup |
|---|---|---|
| 1 | Archer Motor Oil (SAE 10w30) | 1135% |
| 2 | Prestone Heavy Duty Brake Fluid | 981% |

TABLE 1-continued

| Example | Organic Liquid | Weight Percentage of Pickup |
|---|---|---|
|   | (DOT 3) |   |
| 3 | Peak Anti-Freeze | 1183% |
| 4 | Case IH Gear Lube (SAE 85w140) | 1189% |
| 5 | Sergent-Welch Duo Seal Pump Oil | 1000% |

As can be seen from Table 1, the kenaf balls recovered at least 10 times their own weight of the organic liquids in every experiment with the exception of Example 2 where heavy duty brake fluid was used in making the oil slick. Even in Example 2, the kenaf ball picked up close to 1000% of their weight of the organic liquid. This experiment showed the tremendous ability of kenaf balls to adsorb oil from oil slicks on the surface of water.

COMPARATIVE EXAMPLE 6

In this experiment the procedure used in Examples 1-5 was repeated expect kenaf core material was utilized in place of the kenaf balls. The oil used in this experiment was Archer Motor Oil (SAE 10w30) as was utilized in Example 1. In this procedure the kenaf core material absorbed the oil in an amount that was equivalent to 461% of its own weight. This comparative example shows that the kenaf balls used in Example 1 were much better at adsorbing oil per unit weight than was the kenaf core material used in this experiment.

EXAMPLE 7

In this experiment the procedure used in Example 1 was repeated except the kenaf balls were saturated with water before being used for oil recovery. The kenaf balls were saturated with water by emersing them in water for a period of 1 hour. During this entire 1 hour period the kenaf balls were held under the surface of the water. The kenaf balls picked up 568% water, based upon their initial weight. Then, the water saturated kenaf balls were placed into a cup having the 10w30 weight motor oil slick floating on the surface of water (as in Example 1).

The water saturated kenaf balls were placed directly in the cup without squeezing or draining any water from the kenaf balls. The water saturated kenaf balls were then allowed to float in the oil slick for a few minutes. The kenaf balls were then removed from the cup. Then, 13 ml of water and 7 ml of oil was squeezed out of the kenaf balls. After squeezing the liquids out of the kenaf balls they were again reintroduced into the cup. After a few minutes floating in the oil slick the kenaf balls were again removed from the cup and 22 ml of oil was squeezed from the kenaf balls. The kenaf balls were again placed back into the oil slick. This time 15 ml of oil was recovered. The kenaf balls were placed back into the oil slick for one final time and 15 ml of oil was again recovered.

This experiment shows that being saturated with water does not destroy the ability of kenaf balls to adsorb oil. It also shows that oil can be squeezed out of kenaf balls and that they can be recycled for subsequent used in recovering oil from oil slicks floating of water.

EXAMPLE 8

In this experiment kenaf balls weighing approximately 1 grams, 3 grams, 5 grams, and 10 grams were soaked in 150 ml of 10W-30 motor oil. The 1 gram, 5 gram, and 10 gram kenaf balls were placed into the motor oil and allowed to soak for 2 hours and the 3 gram kenaf balls were allowed to soak for 24 hours. The kenaf balls were removed, placed into tared plastic weight boats, and re-washed to determine the amount of oil absorption/trapping. A 24 hour exposure in oil using the commercially available absorbent material was also conducted. The results of this testing are shown in Table 2 below.

TABLE 2

| Weight | Exposure Time | Oil Absorption/Trapping |
| --- | --- | --- |
| 1 gram of Kenaf Balls | 2 hours | 1956% |
| 3 grams of Kenaf Balls | 24 hours | 1951% |
| 3 grams of Kenaf Balls | 24 hours | 2158% |
| 5 grams of Kenaf Balls | 2 hours | 1691% |
| 10 grams of Kenaf Balls | 2 hours | 1775% |
| 3 grams of Commercial Oil Absorbent Material | 24 hours | 1059% |

As can be seen from Table 2 the kenaf balls of this invention collected much higher percentage of oil than did the commercial oil absorbent material. In all of the samples tested in this experiment the kenaf balls collected more than 1600% of their weight in oil. In one experimental run the kenaf balls collected over 2100% of their weight in oil.

EXAMPLE 9

Kenaf balls weighing approximately 2 grams were placed into two separate beakers that each contained 150 ml of water and 50 ml of 10W-30 oil. The oil was allowed to float on top of the water with clear separation of the oil and water being visible. The kenaf balls were placed into the oil layer and allowed to stand for two hours. The oil layer was not as thick as the thickness of the kenaf balls placed into the oil. It was observed that the kenaf balls began to absorb/trap the oil and at the end of the two hour exposure the beaker was primarily clear of oil. Three grams of the commercial material were also tested in the same manner but it was observed that a portion of the oil remained on top of the water at the conclusion of the two hour exposure. The results of this experiment are reported in Table 3.

TABLE 3

| Weight | Exposure Time | Oil Absorption/Trapping |
| --- | --- | --- |
| 2 gram of Kenaf Balls | 2 hours | 1757% |
| 2 grams of Kenaf Balls | 2 hours | 1815% |
| 3 grams of Commercial Oil Absorbent Material | 2 hours | 886% |

As can be seen from Table 3 the kenaf balls of this invention again proved to collect much more oil per unit weight than did the commercial oil absorbent material. In all of the samples tested in this experiment the kenaf balls collected more than 1700% of their weight in oil. The commercial oil absorbent material only collected 886% of its weight in oil.

EXAMPLE 10

Five separate kenaf balls each weighing approximately 3 grams were placed into separate beakers each containing 150 ml of water and 50 ml of 10W-30 oil with the oil and water being shaken vigorously by hand for one minute. The kenaf balls were placed into the beakers and allowed to stand for 24 hours. It was observed that the emulsion did not become clear at the conclusion of 24 hours and that there were traces of oil clinging to the side of the beakers. Yet, it was noted that the percentage of absorption/trapping was similar to that of the static test for the kenaf material. The results of this experiment are reported in Table 4.

TABLE 4

| Weight | Exposure Time | Oil Absorption/Trapping |
| --- | --- | --- |
| 3 gram of Kenaf Balls | 24 hours | 1730% |
| 3 grams of Kenaf Balls | 24 hours | 1715% |
| 3 grams of Kenaf Balls | 24 hours | 1651% |
| 3 grams of Kenaf Balls | 24 hours | 1810% |
| 3 grams of Kenaf Balls | 24 hours | 1912% |

As can be seen from Table 4 all of the kenaf balls collected more than 1600% of their weight in oil.

EXAMPLE 11

Five separate kenaf balls each weighing approximately 3 grams were placed into five separate beakers (150 ml, 250 ml, 350 ml, 500 ml, and 1000 ml) each containing different amounts of 10W-30 oil. This test series consisted of placing the kenaf balls into the beakers, exposing them for 24 hours, draining them for 24 hours, squeezing them with a 10 lb roller, re-exposing them for 24 hours, draining them for an additional 24 hours, and again squeezing them with a 10 lb roller. The weight of each kenaf ball was determined after each step. The squeezing of the kenaf balls after each draining period consisted of placing the balls between the commercial material and rolling them several times with a 10 lb weight. The results listed below summarize the average percentage weight after each step for all five kenaf balls. The results of this experiment are reported in Table 5.

TABLE 5

| Test Parameter/Step | Average Weight Percent After each Test Step |
| --- | --- |
| Initial 24 hours of Exposure | 2028 |
| Initial 24 hour Drain | 1131 |
| Initial Squeeze | 267 |
| Second 24 hour Exposure | 1468 |
| Second 24 Hour Drain | 988 |
| Second Squeeze | 221 |

While certain representative embodiments and details have been shown for the purpose of illustrating the subject invention, it will be apparent to those skilled in this art that various changes and modifications can be made therein without departing from the scope of the subject invention.

What is claimed is:

1. A kenaf ball which is comprised of an entangled mass of kenaf fibers, wherein the kenaf ball has a density which is within the range of about 0.02 g/cc to about 0.15 g/cc, and wherein the kenaf ball has a mass which is within the range of 0.2 grams to about 10 grams.

2. A kenaf ball as specified in claim 1 wherein the kenaf ball contains a substantial volume of interstices between the kenaf fibers, and wherein the interstices penetrate the kenaf ball and open to the outside.

3. A kenaf ball as specified in claim 1 wherein the entangled mass of kenaf fibers is a non-woven mass of kenaf fibers.

4. A kenaf ball as specified in claim 1 wherein the kenaf ball has a density which is within the range of about 0.04 g/cc to about 0.12 g/cc.

5. A kenaf ball as specified in claim 1 wherein the kenaf ball has a mass which is within the range of 0.5 grams to about 5 grams.

6. A kenaf ball as specified in claim 1 wherein the kenaf ball has a length in its longest dimension of less than 3 inches.

7. A kenaf ball as specified in claim 1 wherein the kenaf ball has a length in its longest dimension of at least 0.5 inch.

8. An oil cleanup kit which is comprised of a plurality of kenaf balls, wherein the kenaf balls are comprised of an entangled mass of kenaf fibers, wherein the kenaf balls has an average density which is within the range of about 0.02 g/cc to about 0.15 g/cc, and wherein the kenaf balls have an average mass which is within the range of 0.2 grams to about 10 grams.

9. An oil cleanup kit as specified in claim 8 wherein the oil cleanup kit contains at least 50 kenaf balls.

10. An oil cleanup kit as specified in claim 8 wherein the oil cleanup kit contains at least 0.5 pounds of kenaf balls.

11. A kenaf ball as specified in claim 1 wherein the kenaf ball contains less than 10 weight percent core material.

12. A kenaf ball as specified in claim 1 wherein the kenaf ball is void of binders containing carboxyl groups.

13. A method for cleaning an oil spill area which comprises: (1) placing a plurality of kenaf balls as specified in claim 1 in contact with the oil in the oil spill area, (2) allowing the kenaf balls to remain in contact with the oil for a period of time which is sufficient for the oil to be substantially absorbed into the kenaf balls to produce oil containing kenaf balls, and (3) removing the oil containing kenaf balls from the oil spill area.

14. A method for cleaning an oil spill area as specified in claim 13 which further comprises burning the oil containing kenaf balls that are removed from the oil spill area.

15. A method for cleaning an oil spill area as specified in claim 13 which further comprises recovering the oil from the oil containing kenaf balls that are recovered from the oil spill area.

16. A method for cleaning an oil spill area as specified in claim 1 wherein the kenaf balls contains a substantial volume of interstices between the kenaf fibers, wherein the interstices penetrate the kenaf ball and open to the outside, wherein the oil in the oil containing kenaf balls is in the interstices between the kenaf fibers, and wherein the oil is recovered from the oil containing kenaf balls by squeezing the kenaf balls to force the oil out of the interstices between the kenaf fibers to produce recycled kenaf balls.

17. A method for cleaning an oil spill area as specified in claim 16 wherein the recycled kenaf balls are subsequently used to recover spilled oil.

18. A method for cleaning an oil spill area as specified in claim 13 wherein the oil spill area is on water.

19. A method for manufacturing kenaf balls which comprises subjecting kenaf fibers to a tumbling action for a period of time that is sufficient to entangle the kenaf fibers into entangled balls having masses which are within the size range of about 0.2 grams to about 10 grams, wherein the kenaf balls have a density which is within the range of about 0.02 g/cc to about 0.15 g/cc.

* * * * *